US009348656B2

(12) United States Patent
Presant et al.

(10) Patent No.: US 9,348,656 B2
(45) Date of Patent: May 24, 2016

(54) APPARATUS AND METHOD FOR MANAGING POWER AMONG A PLURALITY OF PROCESSORS SHARING A THERMAL PLATFORM

(75) Inventors: Stephen D. Presant, San Jose, CA (US); Alexander J. Branover, Chestnut Hill, MA (US); Oleksandr Khodorkovsky, Toronto (CA); Ljubisa Bajic, Toronto (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 744 days.

(21) Appl. No.: 13/329,988

(22) Filed: Dec. 19, 2011

(65) Prior Publication Data

US 2013/0159755 A1 Jun. 20, 2013

(51) Int. Cl.
| | |
|---|---|
| *G06F 1/00* | (2006.01) |
| *G06F 11/30* | (2006.01) |
| *G06F 9/50* | (2006.01) |
| *G06F 1/20* | (2006.01) |
| *G06F 1/32* | (2006.01) |

(52) U.S. Cl.
CPC .............. *G06F 9/5094* (2013.01); *G06F 1/206* (2013.01); *G06F 1/324* (2013.01); *G06F 1/3296* (2013.01); *Y02B 60/1217* (2013.01); *Y02B 60/1275* (2013.01); *Y02B 60/1285* (2013.01); *Y02B 60/142* (2013.01)

(58) Field of Classification Search
USPC .................................................. 713/300, 320
See application file for complete search history.

(56) References Cited

U.S. PATENT DOCUMENTS

| | | | |
|---|---|---|---|
| 6,754,837 B1 | 6/2004 | Helms | |
| 7,396,508 B1 * | 7/2008 | Richards | ................ G01N 1/312 |
| | | | 141/145 |
| 7,624,287 B2 | 11/2009 | Khodorkovsky et al. | |
| 7,734,941 B2 | 6/2010 | Khodorkovsky et al. | |
| 2005/0132362 A1 | 6/2005 | Knauerhase et al. | |
| 2006/0161375 A1* | 7/2006 | Duberstein | ............. G06F 1/206 |
| | | | 702/132 |
| 2006/0161793 A1 | 7/2006 | Orr | |
| 2007/0127209 A1* | 6/2007 | Lopatinsky | ........... H01L 23/427 |
| | | | 361/700 |
| 2007/0206018 A1 | 9/2007 | Bajic et al. | |
| 2008/0058999 A1 | 3/2008 | Khodorkovsky et al. | |
| 2009/0102849 A1 | 4/2009 | Khodorkovsky et al. | |
| 2010/0117579 A1 | 5/2010 | Culbert et al. | |
| 2011/0060924 A1 | 3/2011 | Khodorkovsky | |
| 2011/0060928 A1 | 3/2011 | Khodorkovsky et al. | |

(Continued)

FOREIGN PATENT DOCUMENTS

JP     2006260445     9/2006

*Primary Examiner* — Mohammed Rehman
(74) *Attorney, Agent, or Firm* — Faegre Baker Daniels LLP

(57) ABSTRACT

A method and apparatus includes a multi-processor apparatus including a plurality of integrated circuit processors having a shared thermal platform. Each processor has at least one subsystem operable at a plurality of different power settings, at least one internal thermal parameter detector providing power data related to the processor, and a power management unit. The method and apparatus illustratively shares power data from the at least one internal thermal parameter detector of each processor between the power management units of the plurality of processors; compares the shared power data from the plurality of processors to a thermal design power limit for the shared thermal platform; and controls a power setting of the at least one subsystem of the plurality of processors within the shared thermal platform based on the comparison of the shared power data to the thermal design power limit for the shared thermal platform.

30 Claims, 3 Drawing Sheets

(56) References Cited

U.S. PATENT DOCUMENTS

| | | | |
|---|---|---|---|
| 2011/0109243 A1* | 5/2011 | Kim | H05B 33/0812 315/294 |
| 2011/0148923 A1 | 6/2011 | Sadowski et al. | |
| 2011/0264934 A1 | 10/2011 | Branover et al. | |
| 2012/0072749 A1* | 3/2012 | Conroy et al. | 713/322 |
| 2012/0117403 A1* | 5/2012 | Bieswanger et al. | 713/322 |
| 2012/0166832 A1* | 6/2012 | Henry et al. | 713/320 |
| 2012/0185709 A1* | 7/2012 | Weissmann et al. | 713/320 |
| 2013/0138977 A1* | 5/2013 | Herman et al. | 713/300 |
| 2013/0151883 A1* | 6/2013 | Winbom | H04L 12/6418 713/500 |

* cited by examiner

APPARATUS AND METHOD FOR MANAGING POWER AMONG A PLURALITY OF PROCESSORS SHARING A THERMAL PLATFORM

BACKGROUND OF THE DISCLOSURE

The present disclosure relates generally to a method and apparatus for power management of integrated circuit processors, and more particularly to power management of a plurality of processors in a multi-processor device having a shared thermal platform.

The thermal design power (TDP) is the maximum power that can be dissipated by a computer system. Typically, the sum of power consumed by each individual component of a system cannot exceed this TDP limit for sustained periods without risking failure or damage to the system. In order to protect the system from such a TDP violation, a power budget is typically allocated statically to each system component. Because the power budget restricts the performance of individual components (e.g., integrated circuit processors), some workload distributions will cause unnecessary performance loss when some components have TDP slack or headroom while other components' performance is limited by their associated power budget.

Some known solutions monitor conditions such as temperature and/or current of multi-processor apparatus, and have a rigid and static response when the monitored conditions of the apparatus exceed a predefined threshold. When this threshold is surpassed, individual processors of the apparatus may take protective action by stepping down to the next discrete power setting until the condition is no longer present. However, this known approach is often insufficient because of such a coarse-grained approach will often over react to the thermal event unnecessarily reducing performance, or create unsatisfactory performance variability.

Accordingly, there exists a need for an improved method and apparatus for controlling power consumption levels of a multi-processor system sharing the same thermal management platform.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
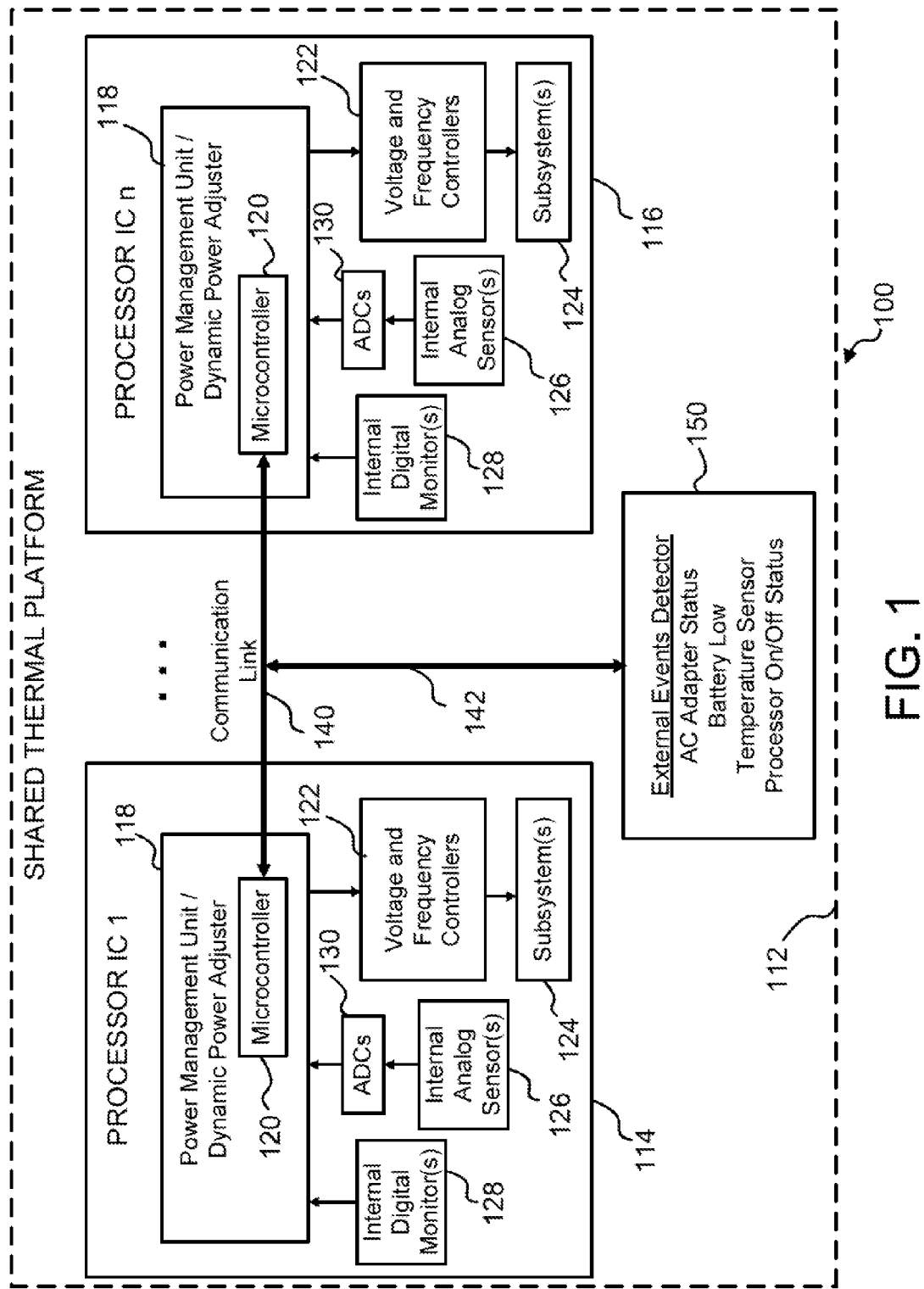
FIG. 1 is a block diagram illustrating an exemplary embodiment of a multiple processor apparatus having a shared thermal platform.

Briefly, in one example, a method and apparatus includes a multi-processor apparatus including a plurality of integrated circuit processors having a shared thermal platform. Each processor has at least one subsystem operable at a plurality of different power settings, at least one internal thermal parameter detector providing power data related to the processor, and a power management unit. The method and apparatus illustratively shares power data from at least one internal thermal parameter detector of each processor between the power management units of the plurality of processors; compares the shared power data from the plurality of processors to a thermal design power limit for the shared thermal platform; and controls a power setting of at least one subsystem of the plurality of processors within the shared thermal platform based on the comparison of the shared power data to the thermal design power limit for the shared thermal platform. In one example, comparing the shared power data from the plurality of processors to a thermal design power limit for the shared thermal platform includes comparing at least one of estimated power consumption data and temperature data to at least one threshold value.

In one example of the method and apparatus, the power management unit of each of the processor receives power data from the power management units of the other processors. The power management unit of each processor then controls power settings for its associated at least one subsystem based on the comparison of the shared power data to the thermal design power limit for the shared thermal platform.

In another example of the method and apparatus, one of the plurality of processors is a master processor. The power management unit of the master processor receives power data from its own at least one internal thermal parameter detector and from the power management unit of at least one other processor. The power management unit of the master processor then compares the received power data to the thermal design power limit for the shared thermal platform and controls power settings for at least one subsystem of both the master processor and at least one other processor based on the comparison of the received power data to the thermal design power limit for the shared thermal platform.

In an exemplary embodiment, the master processor sends instructions to at least one other processor via a communication link. The instructions are operative to control a power setting for at least one subsystem of at least one other processor. In one example, the master processor determines whether a change in a power setting configuration for one of the other processors is needed before the master processor sends instructions to at least one other processor via the communication link.

Advantageously, the present method and apparatus provides communication between a plurality of different processors of a multi-processor apparatus having a shared power platform to coordinate power management so that a power consumption level of the apparatus does not exceed the TDP budget for the shared power platform, while performance of the individual processors of the multi-processor apparatus is optimized.

In one illustrated embodiment, the power management units allow use of at least one of an increased functionality and a high power state for at least one subsystem of at least one of the plurality of processors when the comparing the shared power data indicates that there is TDP slack or headroom for the shared thermal platform. The power management units inhibit use of at least one of a functionality and a high power state for at least one subsystem of at least one of the plurality of processors when the comparing the shared power data indicates that there is a TDP violation for the shared thermal platform.

In one example, at least one internal thermal parameter detector includes at least one of a power monitor operable to determine an estimated power consumption level for its associated processor and a temperature sensor operable to determine a temperature of its associated processor. The internal thermal parameter detector may be an internal analog sensor and/or an internal digital monitor on each processor.

In another illustrated embodiment, at least one power management unit of the plurality of processors receives information from an external events detector. The received information is used to control the power setting of at least one subsystem for the plurality of processors. In one example, the method and apparatus detects that at least one of the plurality of processors has been turned off, and allows use of at least one of an increased functionality and a high power state for at least one subsystem of at least one other of the plurality of processors.

Among other advantages, the method and apparatus of the present disclosure permits a multi-processor system or apparatus 100 to implement a fine-grain control of its response to a thermal design power (TDP) violation and its handling of TDP headroom by providing communication between multiple processors related to power management and then adjusting power settings of subsystems of any of the processors 114, 116 sharing the same thermal platform 112.

For the purposes of promoting an understanding of the principles of the present disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

FIG. 1 illustrates one example of multi-processor system or apparatus 100 which provides a shared thermal platform 112 for a plurality of processor integrated circuits 114, 116 of the apparatus 100. Although two processors 114 and 116, labeled as Processor IC1 and Processor ICn, are shown in FIG. 1, it is understood that additional processors may be included within the apparatus 100 and the shared thermal platform 112. The apparatus 100 may be any suitable device, for example, a laptop computer, desktop computer, media center, handheld device (e.g., mobile or smart phone, tablet, etc.), Blu-ray™ player, gaming console, set top box, printer, or any other suitable device. In illustrated examples, the processors 114, 116 may implement an operating system (OS), drivers, and/or a basic input/output system (BIOS). The processors 114, 116 may be, for example, a central processing unit (CPU) having one or multiple cores, a graphics processing core, a general processor (e.g., APU, accelerated processing unit, or general-purpose computing on GPU), or any other suitable integrated circuit processor.

In an illustrated example, each of the plurality of processors 114, 116 includes a power management unit 118. Each power management unit 118 provides a dynamic power adjustor which controls a voltage and frequency controller 122 for adjusting power consumption levels of one or more power consuming subsystems 124 which operate various power settings, such as clock frequencies and voltage levels. Typically, power management unit 118 adjusts the frequency of a clock generator to control power settings of subsystem(s) 124 and the supply required voltages necessary for of the frequency settings. Each processor 114, 116 may have default configurations that power management units 118 use to manage frequency and voltage power settings and/or power states set by controllers 122 for subsystem 124.

Illustratively, components of the power management unit 118 may be firmware running on an embedded microcontroller 120. Power management unit 118 may also be implemented as a hard coded finite state machine or other suitable combination of hardware and software components in other illustrated embodiments. Power management unit 118 receives inputs from analog sensors 126 and digital monitors 128 and sends dynamic power adjustment decisions for clock frequency settings and other power controls of the subsystems 124 to the voltage and frequency controller 122.

The shared thermal platform 112 has a predefined maximum power consumption level according to a TDP budget of the apparatus 100. In the illustrated embodiment of FIG. 1, each processor integrated circuit 114, 116 includes a plurality of internal analog sensors 126 and internal digital monitors 128 which provide data used as input parameters to the power management unit 118 relative to conditions detected on the corresponding local processor 114, 116. For example, the analog sensors 126 and digital monitors 128 monitor temperature of the processors 114, 116. The analog sensors 126 and digital monitors 128 may also monitor voltages and frequencies of each of the subsystems 124 of processors 114, 116. For instance, in an example where processor 114, 116 is a graphics processing core, the subsystems 124 may be a graphics engine, a display engine, an encoding engine, and a decoding engine, for example. The power management unit 118 illustratively provides a sensor management unit which samples the signals from the internal analog sensors 126 and/or digital monitors 128 at predetermined sampling intervals and processes data from the signals generate controls for voltage and frequency controller 122 coupled to each of the subsystems 124 of processor 114, 116.

Each of the subsystems 124 of processors 114, 116 may be supplied with power at various power states including different operating frequencies and voltages. In some embodiments, the subsystems 124 are operable at a plurality of discrete power state levels. In other embodiments, the subsystems 124 may be operated at a plurality of different frequency and voltage levels within an operating range between maximum and minimum frequencies and voltages.

The power management unit 118 has one or more goals for the shared thermal platform 112 when selecting voltage and frequency settings for controllers 122 of subsystems 124 including minimizing energy usage, maximizing performance, and avoiding thermal faults within the shared thermal platform 112. Often a combination or compromise is needed, such as (1) maximize performance while avoiding thermal faults; or (2) minimize energy while maintaining minimum or good performance levels.

As discussed above, the power management unit 118 of each processor 114, 116 may be in operative communication with internal analog sensors 126 and/or internal digital monitors 128. Analog sensors 126 detect temperature, current draw, or other physical phenomenon of the processors 114, 116. These "sensed" phenomenon are digitized by analog to digital converters (ADCs) 130 and provided to the power management units 118. For example, a higher temperature may cause an analog temperature sensor 126 to output a higher voltage, and then the ADC 130 generates and N bit integer value that represents that temperature. In one embodiment, the power management unit 118 may compare the sensed temperature from the analog sensor 126 to reference thresholds for determining TDP headroom or a TDP violation. If the sensed temperature exceeds a first higher threshold, then action is taken to reduce power consumption. If the sensed temperature is less than a second lower threshold, then TDP headroom is available for use by subsystems 124 of processors 114, 116. The TDP headroom and violation determination methods used are internal to each processor IC 114, 116, is not part of the invention addressed in this disclosure. Each processor 114, 116 has internal TDP determination methods, and based on those methods, the present system better manages performance and power at the platform level by using communication and coordination among the multiple processors 114, 116 as described herein.

The digital monitors 128 may estimate temperature and power consumption of the processors 114, 116, for example. Power consumption does not directly track voltage and frequency of the subsystems 124 due to factors such as aggressive clock gating. This means that different applications, or even timing intervals within an application, will consume different levels of power. A digital power monitor 128 is therefore used to help estimate power consumption of processors 114, 116 based on various digitally tracked conditions. These conditions might include clock gating enable signal, performance counters, or other event counters. Power management units 118 of processors 114, 116 may consider temperature and/or power consumption, or a combination of both, to determine whether TDP headroom exists or a TDP violation has occurred (or is about to occur) and, therefore, whether frequency and voltage or power state changes should be executed for subsystems 124 of one or more of the processors 114, 116.

While processor IC's 114 and 116 are shown to be identical in FIG. 1, the processors 114, 116 are not necessarily identical in all embodiments and may be implemented differently. For processor example 114 may be a general purpose multi-core microprocessor, and processor 116 may be a graphics or multimedia accelerator, for example. These heterogeneous components may co-exist in the shared thermal platform and share a communication link and platform power management policy. Some processors 114, 116 may heavily rely on analog sensors 126, while others may heavily rely on digital monitors 128. The system may also use a combination of analog sensors 126 and digital power monitors 128. For example, the analog sensed temperature could be use to refine the digitally estimated power, since leakage component is dependent on temperature. In another approach, digitally estimated power may be used by default because it reduces [component to component] performance variability but may be less accurate (for example, due to component process variability). In such systems, the analog sensed temperature may be use a "backup" or insurance policy for a primarily digital system. In some embodiments each processor 114, 116 in the shared thermal platform 112 may have different implementations for all of the underlying controllers, monitors, converters, subsystems 124, and power management unit 118.

In an illustrated example, the power management units 118 of the multiple processors 114, 116 are connected by a communication link 140 so that communication occurs between the power management units 118 of processors 114, 116. The use of embedded microcontrollers 120, for example, which communicate with each other provides increased predictability and stability and faster response times than conventional power management systems. The communication link 140 may be discrete wire connections, a shared bus address-based communication network, a ring or star configuration, or other suitable link to permit communication via known communication protocols between the power management units 118 of different processors 114, 116.

Each of the power management units 118 of processor 114 and 116 not only receives local power management data related to TDP parameters from its own internal analog sensors 126 and digital monitors 128, but may also receive remote power management data related to a TDP parameters from the remote analog sensors 126 and digital monitors 128 of other processors 116, 114 within the same shared thermal platform 112. If either a TDP violation or TDP headroom is detected in the shared thermal platform 112, each power management unit 118 can either take power management action related to its own subsystem components 124 or send communication via communication link 140 to power management unit(s) 118 of other processor(s) 116, 114 with instructions to adjust power settings of the other processor's subsystems 124.

An external events detector 150 may also be in operative communication with the power management units 118 of processors 114 and 116 via communication link 142. Again, the communication link 142 may be discrete wire connections or a shared communication network, for example. The external events detector 150 may be an operating system of the apparatus 100, for example, which alerts the power management units 118 when specific external events are detected. For example, external events detector 150 may advise the power management units 118 of the status of an AC adapter used to power the apparatus 100. If a new AC adapter is used, for example, external events detector 150 notifies power management units 118 of any different maximum power consumption considerations based on the new AC adaptor, such as to keep the new AC adapter from overheating, for example. The external events detector 150 may also provide a low battery indicator to cause power management units 118 to reduce power consumption of subsystems 124. In addition, detector 150 may provide an overall temperature indication for the apparatus 100. The external events detector 150 may also send indications to the power management units 118 when one of the other processors is turned off. If one processor 116 is turned off, for example, other processor(s) 114, 116 may increase local functionality or allow the use of local high power states. The power management unit 118 of each active or powered processor 114, 116 may be reconfigured based on the external event, for example a power or temperature threshold setting may change.

Figure 2:
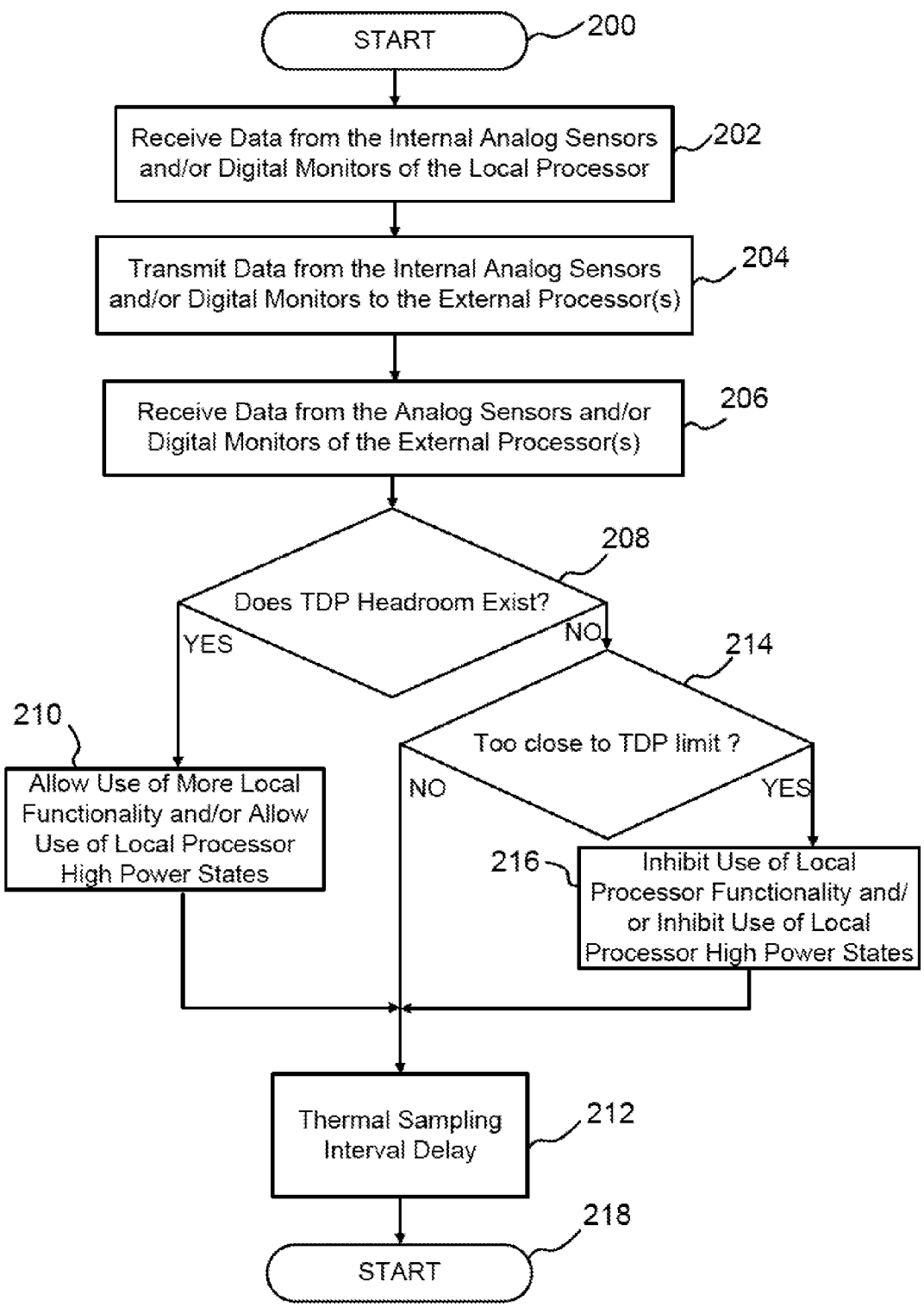
FIG. 2 is a flowchart illustrating an exemplary method for communicating between multiple processors of an apparatus having a shared thermal platform to determine a coordinated response to thermal conditions of the apparatus and adjust power consumption levels of subsystem components of a multiple processors.

In one illustrated embodiment of the present disclosure, each of the power management units 118 of the multiple processors 114, 116 may control power consumption for its own subsystem components 124. The multiple processors 114, 116 also communicate local power monitoring data to other processors 116, 114. Therefore, both local and external power data may be used to adjust power consumption levels of each processor 114, 116. FIG. 2 is an example of such a "balanced system" in which multiple processors 114, 116 of apparatus 100 communicate with each other to manage power consumption levels of each processor 114, 116 in the shared thermal platform 112 of the apparatus 100.

In FIG. 2, the process begins at block 200. The power management unit 118 of each processor 114, 116 receives local data from internal analog sensors 126 and digital monitors 128 as illustrated at block 202. Each power management unit 118 then transmits its local data from internal analog sensors 126 and digital monitors 128 to the power management units 118 of other processors 114, 116 via the communication link 140 as illustrated at block 204. Power management units 118 of processors 114, 116 also receive external data from external analog sensors 126 and digital monitors 128 of other processors 116, 114 in the shared thermal platform 112 as illustrated at block 206.

Next, each power management unit 118 of processors 114, 116 determines whether or not TDP headroom exists for the shared thermal platform 112 as illustrated at block 208. For instance, each power management unit 118 can look for TDP headroom for its own processor 114 or for other processors 116 of the shared thermal platform 112. Power management unit 118 may consider average power consumption, temperature, current or combinations of these factors for each processor 114, 116 to determine TDP headroom of the shared thermal platform. For example, each power management unit 118 may determine a whether the power consumption or temperatures is less than a predetermined threshold to determine whether TDP headroom exists for the shared thermal platform 112 at block 208.

If TDP headroom does exist at block 208, power management unit 118 allows the use of more local functionality including the use of local high power states, if processor performance benefits from using these states, as illustrated block 210. In other words, if the power management units 118 of processors 114, 116 determine that TDP headroom exists at block 208, then each power management unit 118 may control its local voltage and frequency controllers 122 to increase power settings (frequency and/or voltage supplied) to subsystems 124 to increase performance of the subsystems 124 as illustrated at block 210. A thermal sampling delay is then provided at block 212. The sampling delay provides a delay time until the power management unit 118 again samples thermal parameters from its internal analog sensors 126 and digital monitors 128.

If TDP headroom does not exist at block 208, the power management units 118 of processors 114, 116 determine whether or not any of the processors 114, 116, or the combined thermal platform 112, are operating too close to TDP limits as illustrated at block 214. For instance, if the temperature, average power consumption, current levels or combinations of these thermal parameters exceed a threshold level, power management units 118 will determine that the processor 114, 116, or the combined thermal platform 112, is operating too close to the TDP limits at block 214.

If the processor(s) 114, 116, or the combined thermal platform 112, are not operating too close to the TDP limits at block 214, the power management units 118 provide a thermal sampling delay at block 212 without changing the functionality or inhibiting the use of local processor high power states. On the other hand, if the processor(s) 114, 116, or the shared thermal platform 112, are operating too close to the TDP limit at block 214, power management unit 118 inhibits the use of local functionality and/or local high power states for its associated processor 114, 116 as illustrated at block 216. Therefore, power management unit 118 will not allow the use of high power states by voltage and frequency controller 122 for subsystems 124. Other functionality of subsystems 124 may be inhibited at block 216. Next, a thermal sampling interval delay is provided at block 212. The process ends at block 218.

In one example, if an analog temperature sensor 126 is used, when temperature exceeds a configurable limit, the power management unit 118 may conclude the shared thermal system 112 is operating too close to TDP limits at block 214 and power must be contained, by inhibiting functionality and/or high performance states, for example, at block 216. Alternatively a digital power monitor 128 may estimate power based on event or transaction counters. When the average consumed power over a thermal interval, exceeds a configurable limit, the power management unit may conclude that the shared thermal system 112 is operating too close to TDP limits at block 214, and that power must be reduced by inhibiting functionality and/or high performance states at block 216. For example, if subsystem(s) 124 contain multiple processing elements, some of these processing elements may be disabled to reduce the maximum power consumed within subsystem(s) 124. Alternatively, or in addition, the power management unit 118 may reduce the operating frequency of some processing elements, which also reduces the maximum power consumed within the subsystem(s) 124.

Figure 3:
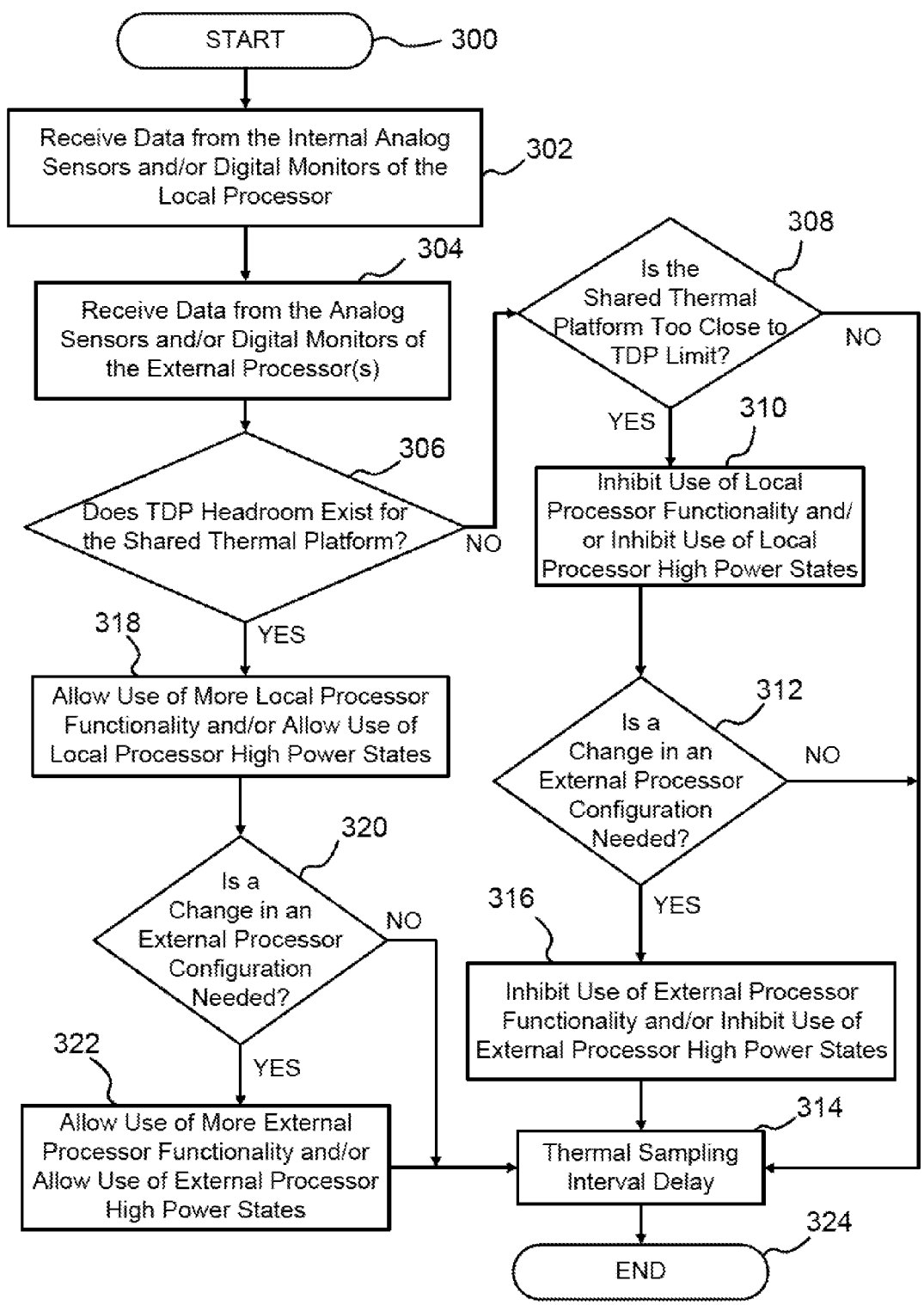
FIG. 3 is a flowchart illustrating details of an exemplary method for managing power setting levels in multi-processor apparatus having a shared thermal platform with one processor acting as a master controller for the shared thermal platform.

An "asymmetric" embodiment of the present disclosure is illustrated in FIG. 3. In the asymmetric embodiment, one processor 114, 116 acts as a master controller for other processors 116, 114. In this example, it is assumed that processor 114 is the master processor, however any of the processors 114, 116 may be the master processor. The process starts at block 300. The power management unit 118 of processor 114 receives local data from its internal analog sensors 126 and digital monitors 128 as illustrated at block 302. Power management unit 118 also receives external data from external analog sensors 126 and digital monitors 128 of each of the other processors 116 of the shared thermal platform 112 over communication link 140 as illustrated at block 304. Since processor 114 is a master processor, it does not need to send its local data from its internal analog sensors 126 and digital monitors 128 to other processors in this illustrated embodiment.

Next, power management unit 118 of processor 114 determines whether TDP headroom exists for the shared thermal platform 112 at block 306 and/or whether the shared thermal platform is too close to or exceeds TDP limits at block 308. Again, the power management unit 118 may analyze average power consumption, temperatures, currents, or a combination thereof, for both the local and external sensor/monitor data to determine whether or not TDP headroom exists at block 306 or a TDP violation exists for the shared thermal platform 112 as illustrated at clock 308. For example, each power management unit 118 may determine whether the thermal parameters such as average power consumption, temperatures, currents or a combination of these parameters are less than a first, lower threshold or higher than a second, higher threshold to determine whether TDP headroom or a TDP violation, respectively, exists for the shared thermal platform 112.

If no TDP headroom exists at block 306, power management unit 118 of master processor 114 determines whether the shared thermal platform 112 is operating too close to the TDP limits at block 308. If not, a thermal sampling delay is provided at block 314. If the shared thermal platform 112 is operating too close to or exceeds the TDP limits at block 308, power management unit 118 may inhibit the use of local functionality or inhibit the use of local high power states for the subsystems 124 of the master processor 114 as illustrated at block 310. In one example, if an analog temperature sensor 126 is used, when temperature exceeds a configurable limit, the power management unit 118 may conclude the shared thermal system 112 is operating too close to TDP limits at block 308 and power must be contained, by inhibiting functionality and/or high performance states, for example, at block 310. Alternatively a digital power monitor 128 may estimate power based on event or transaction counters. When the average consumed power over a thermal interval, exceeds a configurable limit, the power management unit may conclude that the shared thermal system 112 is operating too close to TDP limits at block 308, and that power must be reduced by inhibiting functionality and/or high performance states at block 310.

Next, power management unit 118 of master processor 114 determines whether a change in a power setting configuration for one of the other processors 116 is needed at block 312. For instance, use of certain functionality or high power states in other processors 116 may have already been inhibited during a previous sampling interval. For example, the power management unit 118 of the master processor 114 may contain a table or data structure that defines which power states are allowed or other configuration restrictions that must be applied to the other processors 116, along with the current status of the power states and configurations, for a given power limitation or target power level. If a configuration change is not needed at block 312, the processor 114 does not need to send any messages to the other processor(s) 116 over the communication link 122, thereby reducing communication traffic over communication link 140. Therefore, power management unit 118 of the processor 114 provides a thermal sampling interval delay at block 314 without sending any messages to the other processor(s) 116.

If a change in a power setting configuration of another processor 116 is required at block 312, the power management unit 118 sends messages to the power management unit(s) 118 other processor(s) 116 over the communication link 140 to inhibit the use of external functionality and/or to inhibit the use of external high power states for subsystem(s) 124 of the external processor(s) 116 as illustrated at block 316. A thermal sampling delay is then provided at block 314.

If TDP headroom for the system does exist at block 306, power management unit 118 of master processor 114 may allow the use of more local processor 114 functionality or may allow the use of high power states for the subsystems 124 of the local processor 114, if processor performance benefits from using these states, as illustrated at block 318. Next, power management unit 118 determines whether a change in power setting configuration for one of the other processor(s) 116 is needed at block 320. As discussed above with references to block 312, if configuration changes are not needed at block 320, a thermal sampling interval delay is provided at block 314 without send any messages to the other processor(s) 116 over the communication link 122, thereby reducing communication traffic over communication link 140. Processor 114 then provides a thermal sampling interval delay at block 314.

If a change in external processor power setting configuration is needed at block 320, power management unit 118 of processor 114 sends messages to the power management unit(s) 118 other processor(s) 116 over the communication link 140 to allow the use of more external processor 116 functionality and/or allow the use of external high power states for the subsystem(s) 124 of the external processor(s) 116 as illustrated at block 322. In other words, since TDP headroom exists for the shared thermal platform 112, subsystems 124 may use high power states or increased functionality. Power management unit 118 then provides the thermal sampling delay at block 314, and the process ends at block 324.

The illustrative examples of FIGS. 2 and 3 are not exhaustive or exclusive and other algorithms may be applied for controlling the multiple processor apparatus 100. For example, a hybrid system combining features FIGS. 2 and 3 may be provided in another embodiment. In this example, one master processor 114 can restrict power consumption in the other processors 116, but the others 116 are responsible for their own local monitoring and select their own power states or other power settings and/or functionality to meet the power restrictions set by the master processor 114.

Among other advantages, the method and apparatus of the present disclosure permits a multi-processor system or apparatus 100 to implement a fine-grain control of its response to a thermal design power (TDP) violation and its handling of TDP headroom by providing communication between multiple processors related to power management and then adjusting power settings of subsystems of any of the processors 114, 116 sharing the same thermal platform 112.

Another advantage of the shared thermal platform 112 is to deliver more processing performance within a multi-processor apparatus 100 having a shared thermal platform 112. The shared thermal platform 112 enables selling more premium systems including multiple processors 114, 116 which combined TDP ratings that might otherwise exceed the TDP capacity of the apparatus 100.

Yet another advantage is that if the processors 114, 116 are heterogeneous with different functionality and/or capabilities, then the shared thermal platform 112 as a whole has more functionality and/or capabilities without requiring the overhead of a thermo-mechanical solution that would otherwise be needed to support all of these capabilities concurrently.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method comprising:
sharing power data between a plurality of power management units of a plurality of integrated circuit processors having a shared thermal platform that allows for heat dissipation from the plurality of integrated circuit processors, the power data being from at least one internal thermal parameter detector of each of the plurality of processors;
comparing the shared power data from the plurality of processors to a thermal design power (TDP) limit for the shared thermal platform to determine if TDP headroom for the shared thermal platform exists; and
controlling a power setting of at least one subsystem of the plurality of processors within the shared thermal platform based on the comparison of the shared power data to the thermal design power limit for the shared thermal platform.

2. The method of claim 1, wherein sharing power data between a plurality of power management units of a plurality of integrated circuit processors includes sending and receiving power data between the power management units of the plurality of processors, and wherein each processor controls power settings for its associated at least one subsystem based on the comparison of the shared power data to the thermal design power limit for the shared thermal platform.

3. The method of claim 1, wherein sharing power data between a plurality of power management units of a plurality of integrated circuit processors includes receiving power data with a power management unit of a master controller from its own at least one internal thermal parameter detector; receiving power data with the power management unit of the master controller and from a power management unit of at least one other processor; comparing the received power data to the thermal design power limit for the shared thermal platform; and controlling power settings for the at least one subsystem of both the master processor and the at least one other processor based on the comparison of the received power data to the thermal design power limit for the shared thermal platform.

4. The method of claim 3, further comprising sending instructions from the master processor to the at least one other processor, the instructions being operative to control a power setting for at least one subsystem of the at least one other processor.

5. The method of claim 4, further comprising determining whether a change in a power setting configuration for one of the other processors is needed before sending the instructions to the at least one other processor.

6. The method of claim 1, wherein controlling a power setting of the at least one subsystem for the plurality of processors comprises allowing use of at least one of an increased functionality and a high power state for at least one subsystem of at least one of the plurality of processors when the comparing the shared power data indicates that there is TDP headroom for the shared thermal platform.

7. The method of claim 1, wherein controlling a power setting of the at least one subsystem for the plurality of processors comprises inhibiting use of at least one of a functionality and a high power state for at least one subsystem of at least one of the plurality of processors when the comparing the shared power data indicates that there is a TDP violation for the shared thermal platform.

8. The method of claim 1, wherein the at least one internal thermal parameter detector comprises at least one of a power monitor operable to determine an estimated power consumption level for its associated processor and a temperature sensor operable to determine a temperature of its associated processor.

9. The method of claim 1, further comprising receiving with at least one power management unit of the plurality of processers information from an external events detector, and using the received information for controlling the power setting of the at least one subsystem for the plurality of processors.

10. The method of claim 9, wherein the information from the external events detector is information related to at least one of an AC adapter status, a low battery indication, a temperature of the multi-processor apparatus, and on/off status for the plurality of processors.

11. The method of claim 1, further comprising detecting that at least one of the plurality of processors has been turned off, and allowing use of at least one of an increased functionality and a high power state for at least one subsystem of at least one other of the plurality of processors.

12. The method of claim 1, wherein one of the plurality of processors is a general purpose multi-core microprocessor and another of the plurality of processors is one of a graphics processing core and a multimedia accelerator.

13. The method of claim 1, wherein controlling a power setting of the at least one subsystem of the plurality of processors comprises changing at least one of a frequency setting and a voltage setting for the at least one subsystem of the plurality of processors.

14. The method of claim 1, wherein the at least one internal thermal parameter detector is at least one an internal analog sensor and an internal digital monitor on each processor.

15. The method of claim 1, wherein comparing the shared power data from the plurality of processors to a thermal design power limit for the shared thermal platform comprises comparing at least one of estimated power consumption data and temperature data to at least one threshold.

16. An apparatus comprising:
a plurality of integrated circuit processors having a shared thermal platform that allows for heat dissipation from the plurality of integrated circuit processors, each processor having at least one subsystem operable at a plurality of different power settings, at least one internal thermal parameter detector operative to provide power data related to the processor, and a power management unit; the power management units of the plurality of processors being operable to share power data from the at least one internal thermal parameter detector between the power management units of the plurality of processors; compare the shared power data from the plurality of processors to a thermal design power (TDP) limit for the shared thermal platform to determine if TDP headroom for the shared thermal platform exists; and control a power setting of the at least one subsystem of the plurality of processors within the shared thermal platform based on the comparison of the shared power data to the thermal design power limit for the shared thermal platform.

17. The apparatus of claim 16, wherein the power management unit of each of the processor is operative to receive power data from the power management units of the other processors, and wherein the power management unit of each processor is operative to control power settings for its associated at least one subsystem based on the comparison of the shared power data to the thermal design power limit for the shared thermal platform.

18. The apparatus of claim 16, wherein one of the plurality of processors is a master processor, and wherein the power management unit of the master processor is operative to receive power data from its own at least one internal thermal parameter detector and from the power management unit of at least one other processor; operative to compare the received power data to the thermal design power limit for the shared thermal platform; and operative to control power settings for the at least one subsystem of both the master processor and the at least one other processor based on the comparison of the received power data to the thermal design power limit for the shared thermal platform.

19. The apparatus of claim 18, wherein the master processor sends instructions to the at least one other processor via a communication link, the instructions being operative to control a power setting for at least one subsystem of the at least one other processor.

20. The apparatus of claim 19, wherein the master processor determines whether a change in a power setting configuration for one of the other processors is needed before the master processor sends instructions to the at least one other processor via the communication link.

21. The apparatus of claim 16, wherein the power management units of the plurality of processors being operable to allow use of at least one of an increased functionality and a high power state for at least one subsystem of at least one of the plurality of processors when the comparing the shared power data indicates that there is TDP headroom for the shared thermal platform.

22. The apparatus of claim 16, wherein the power management units of the plurality of processors being operable to inhibit use of at least one of a functionality and a high power state for at least one subsystem of at least one of the plurality of processors when the comparing the shared power data indicates that there is a TDP violation for the shared thermal platform.

23. The apparatus of claim 16, wherein the at least one internal thermal parameter detector comprises at least one of a power monitor operable to determine an estimated power consumption level for its associated processor and a temperature sensor operable to determine a temperature of its associated processor.

24. The apparatus of claim 16, further comprising an external events detector operable to provide at least one power management unit of the plurality of processors with information, and wherein the power management units of the plurality of processors are operable to use the received information from the external events detector to control the power setting of the at least one subsystem for the plurality of processors.

25. The apparatus of claim 24, wherein the information from the external events detector is information related to at least one of an AC adapter status, a low battery indication, a temperature of the multi-processor apparatus, and on/off status for the plurality of processors.

26. The apparatus of claim 16, wherein one of the plurality of processors is a general purpose multi-core microprocessor and another of the plurality of processors is one of a graphics processing core and a multimedia accelerator.

27. The apparatus of claim 16, wherein the power management units of the plurality of processors are operable to control a power setting of the at least one subsystem of the plurality of processors by changing at least one of a frequency setting and a voltage setting for the at least one subsystem of the plurality of processors.

28. The apparatus of claim 16, wherein the at least one internal thermal parameter detector is at least one an internal analog sensor and an internal digital monitor on each processor.

29. The apparatus of claim 16, wherein the power management units of the plurality of processors are operable to compare the shared power data from the plurality of processors to a thermal design power limit for the shared thermal platform by comparing at least one of estimated power consumption data and temperature data to at least one threshold.

30. A non-transitory computer readable storage medium comprising executable instructions that when executed by at least one processor causes the at least one processor to:
receive power data from at least one internal thermal parameter detector;
receive power data from a power management unit of another processor having a shared thermal platform with the at least one processor that allows for heat dissipation from the at least one processor and the another processor;
compare the received power data to a thermal design power (TDP) limit for the shared thermal platform to determine if TDP headroom for the shared thermal platform exists; and
control power settings for the at least one subsystem of the shared thermal platform based on the comparison of the received power data to the thermal design power limit for the shared thermal platform.

* * * * *